2 Sheets—Sheet 1.

E. S. LEAYCRAFT.

Pneumatic Parcel Dispatch Tube.

No. 9,658. Reissued April 12, 1881.

Witnesses
Charles H. Coe
Louis W. Frost

Inventor
Edwin S. Leaycraft

THE NORRIS PETERS CO., PHOTO-LITHO., WASHINGTON, D. C.

2 Sheets—Sheet 2.

E. S. LEAYCRAFT.

Pneumatic Parcel Dispatch Tube.

No. 9,658. Reissued April 12, 1881.

Witnesses
Charles S. Love
Louis W. Frost

Inventor
Edwin S. Leaycraft

THE NORRIS PETERS CO., PHOTO-LITHO., WASHINGTON, D. C.

UNITED STATES PATENT OFFICE.

EDWIN S. LEAYCRAFT, OF NEW YORK, N. Y.

PNEUMATIC PARCEL-DISPATCH TUBE.

SPECIFICATION forming part of Reissued Letters Patent No. 9,658, dated April 12, 1881.

Original No. 178,784, dated June 13, 1876. Application for reissue filed November 22, 1880.

*To all whom it may concern:*

Be it known that I, EDWIN S. LEAYCRAFT, a citizen of the United States, and a resident of the city, county, and State of New York, have invented an Improvement in Pneumatic Parcel-Dispatch Tubes, of which the following is a specification.

This invention relates to the means for introducing or delivering the bucket or carrier without allowing the escape of air or the interruption of the current of air or the carrier passing through the tube.

In the pneumatic parcel-delivery apparatus heretofore constructed the carriers or buckets have passed into a chamber with a perforated partition for stopping the parcel-carrier, which necessitates the opening of some part of the apparatus for extracting the carrier or bucket. This is attendent with labor and loss of time, and obstruction to the current of air passing through the tubes.

I make use of a self-acting valve, that allows the bucket or carrier to pass, and, by closing, retains the air. This valve is available with tubes in which compressed air is employed, also in the exhaust pneumatic apparatus.

Figure 1:
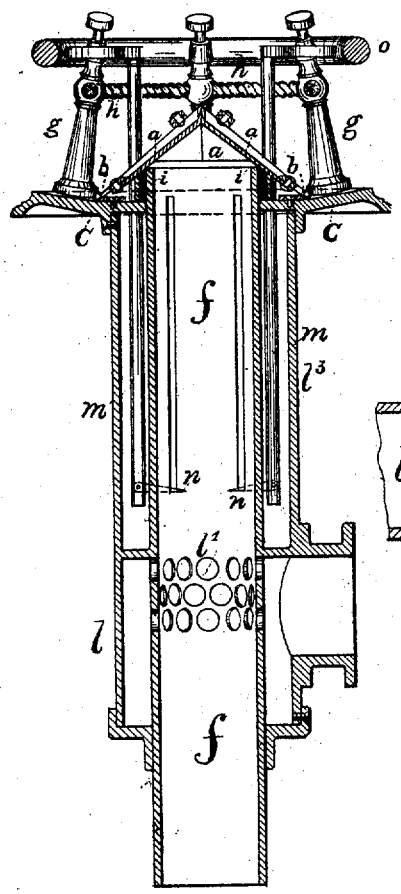
Figure 4:
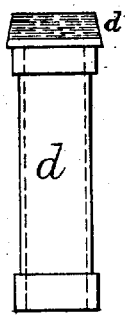
Figure 3:
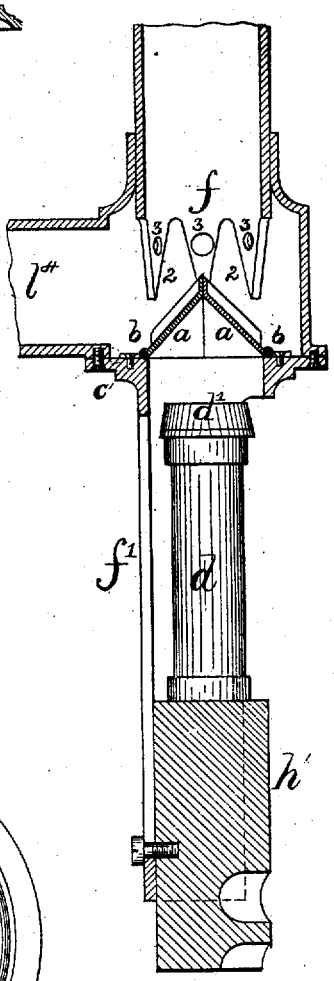
Figure 2:
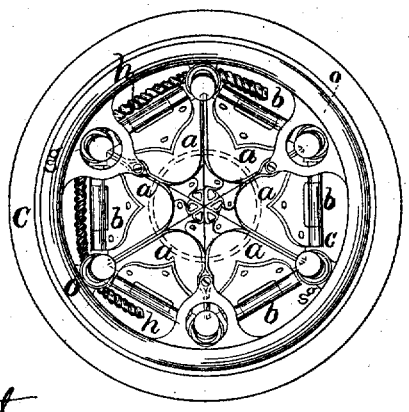
Figure 5:
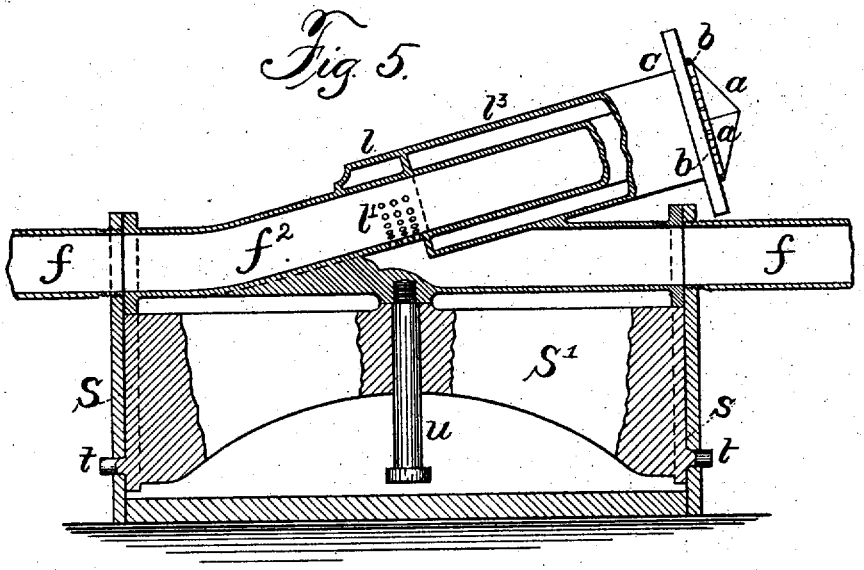
Figure 6:
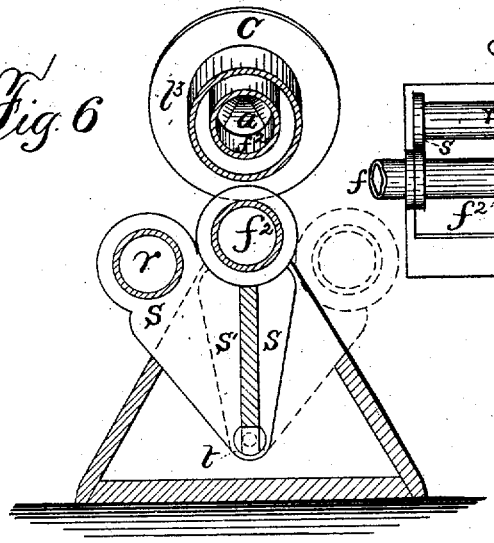
Figure 7:
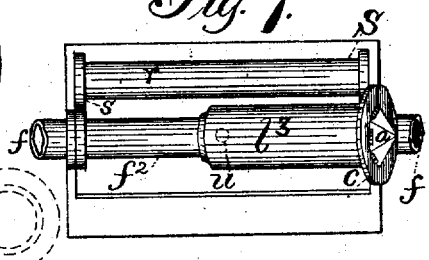

In the drawings, Figure 1 is a longitudinal section of the pneumatic delivery apparatus in the form adapted to an exhaust. Fig. 2 is an end view of the tube, showing the valve. Fig. 3 is a section of the apparatus in the form adapted to compressed air. Fig. 4 is an elevation of the carrier. Fig. 5 is a longitudinal section; and Fig. 6 is a cross-section, showing the apparatus in the form employed at intermediate stations on the pneumatic tube. Fig. 7 is a plan, in smaller size, of the device shown in Figs. 5 and 6.

The improved valve is made preferably as a pyramid and preferably of six sides, each section of the valve being a triangular flap hinged at the base of the triangle.

The sections *a* of the valve are preferably made of thin sheet metal, with the edges turned up, and the hinges *b* at the edge of each triangle unite the same to the base-plate *c*. This construction allows of the several sections *a a* that form the complete valve standing in the direction of the movement of the bucket or carrier *d*. This bucket or carrier *d* is tubular and preferably of leather, with one end closed, and provided with a thick head, *d'*, of felt or similar elastic material at the front end, so that the shock upon the bucket as it falls or is stopped is lessened.

The pneumatic tube *f* is of the desired size, and the bucket or carrier is adapted to fit the same loosely. The valve is in line with this tube, the axis of the pyramid of the cone corresponding to the axis of the tube, and the bucket passing against the inner surfaces of the triangular flaps which form the valve. Such flaps yield and the valve opens to allow the bucket to pass. In Fig. 1 this valve is at the outer end of the tube *f*, and there are short columns *g*, through which a cord, *h*, is passed to form a recoil-stop for the moving ends of the flaps to strike against as they swing open. This cord is of fibrous or elastic material, and serves to stop the movement of the valve-flaps and return them to their seat without concussion or injury after the bucket has passed the valve.

The end of the tube *f* is adapted in shape to the under surfaces of the inclined flaps of the valve, and there should be an elastic packing at *i* around the end of the said tube for the flaps *a* to fall against in closing.

The casing *l* surrounds the tube *f* and forms an air-chamber which is connected with the exhaust.

The tube *f* is provided with openings *l'*, so that the air from the tube *f* is drawn through the openings *l'* into the air-chamber or casing *l*, connected with the exhaust, and thus the suction action which moves the bucket or carrier maintained. It is obvious, also, that after the delivery of the carrier the suction in the tube, or, in other words, the atmospheric pressure outside the valve, will operate to close the said valve.

Upon reference to Figs. 1 and 4 it will be seen that the length of the bucket or carrier *d* is less than the distance between the perforations at *l'* and the valve *a*, and the momentum of the bucket or carrier is not lessened by coming into contact with the valve.

After the piston-head of the carrier *d* has passed the lower end of the slots in which the fingers *n* move, the air in advance of said piston-head can freely circulate through said slots and the surrounding chamber to the rear of said piston-head, whereby the air is not compressed in advance of the carrier, and the carrier, passing beyond the openings *l'*, passes out of the current of air passing off through those openings. Hence the current of air is not in any way interfered with, and there is no tendency to draw the carrier or bucket out of its course, because the openings at $l'$ are uniform around the tube, and there is no counter-current set up in the tube between the holes $l'$ and valve until after the valve is opened by the direct impact of the carrier and the carrier escapes.

The momentum of the bucket in the tube $f$ causes it to pass beyond the casing $l$ and openings $l'$, and will almost always be sufficient to carry the bucket or carrier entirely past the valve and out of the tube, in which case it will fall into a basket or receiver; but in cases where the speed is insufficient or the bucket or carrier becomes obstructed, the swinging fingers $n$ catch the bucket or carrier as it passes the exhaust-casing $l$. These fingers $n$ are similar to pawls, and they are upon the rods $m$, that are outside the tube $f$ in a continuation, $l^3$, of the casing $l$, and the pawls pass through the longitudinal slots in said tube $f$, and the rods $m$ extend to and are united with a ring, $o$, that is outside the end of the tube $f$, so that the rods can be drawn endwise and the fingers will move the bucket out from the tube $f$ should it have remained therein.

In cases where this valve is made use of with compressed air, as in Fig. 3, the valve is applied within the tube $f$, and there is a receiver, $f'$, in line with the tube $f$, such receiver being open at the upper side, so that the bucket $d$ can be laid therein and the sliding plunger $h'$ employed to force the bucket through the valve $a$ into the tube $f$. This plunger $h'$ closes the end of the tube $f$ after it has forced the bucket forward into the tube $f$, so that the atmosphere under pressure supplied by the lateral tube $l^4$ forces the bucket along in the tube $f$.

In this form of pneumatic apparatus, the flaps $a$ forming the valve will be closed by a spring, so as to shut as the plunger $h$ is drawn back.

I make the end of the tube $f$ with points, as shown at 2 2, so that the flaps turn up between those points, and the bucket is guided by those points and the flaps as it enters the tube $f$.

There are perforations at 3 for the free passage of the atmosphere from the lateral branch $l^4$ into the tube $f$.

In order to receive messages, parcels, &c., at an intermediate station, I make use of the swinging section $r$ that is in line with the main or line tube $f$. This section $r$ is provided at its end with plates $s$, that are pivoted at $t$, so that the tube $r$ and the plates $s$ can be swung on the pivots $t$ to move the tubular section $r$ bodily aside, as in Figs. 5 and 6, and bring in the curved continuation $f^2$, that is united to the delivery apparatus before described, so that a bucket coming along the tube will be deflected and delivered, as aforesaid.

I remark that it is necessary to continue the tube $f^2$ the entire length of the section between the standing portions $f$ of the air-tube, so that the atmospheric exhaust or circulation may be operative.

Between the plates $s$ there is a plate, $s'$, carrying a sliding pivot, $u$, and the plates $s$ are recessed to receive the ends of the tube $f^2$, and this tube $f^2$ is attached to the pivot $u$. Hence the tube $f^2$ and the pneumatic delivery apparatus can be drawn away from the plate $s$ laterally, the pivot $u$ sliding in $s'$, and then the said delivery apparatus can be turned around upon the pivot $u$, and moved back to its place, so as to reverse the delivery apparatus, and thereby adapt it to the reception and discharge of packages coming in either direction.

I claim as my invention—

1. In a pneumatic parcel-tube, a self-acting valve that is opened by the direct impact of the parcel-carrier, and closes automatically without interrupting the current of air passing through the tube or pipes.

2. In a pneumatic parcel-tube, a self-acting valve provided with two or more flaps, which are opened by the direct impact of the parcel-carrier and reclosed by the action of the air-current.

3. The combination, substantially as set forth, of the pneumatic tube, the carrier, and a flap-valve, whereby the valve is opened by the direct impact of the carrier, ejected by its own momentum, and the valve closed by the suction action of the air-current and pressure of the atmosphere, thus forming an automatic ejector.

4. The tube $f$, provided with the openings $l'$ and a self-acting valve, and constructed in such a manner that the distance between the openings $l'$ and the valve shall be greater than the length of the carrier.

5. The combination, with the self-acting valve of a pneumatic parcel-tube, of a valve stop-cord, arranged substantially as described, and for the purposes set forth.

6. The fingers $n$, rods $m$, and ring $o$, in combination with the valve $a$, substantially as set forth.

7. The combination, with the valve $a$, of the plunger $h'$, tube $f$, and lateral air-supply pipe $l^4$, substantially as and for the purposes set forth.

8. The swinging tubular section $r$ and plates $s$, in combination with the tube $f$, delivery-tube $f^2$, and valve $a$, substantially as set forth.

9. The sliding pivot $u$, in combination with the tube $f$, delivery-tube $f^2$, reversible pneumatic delivery apparatus, tube $r$, and plates $s$ $s'$, substantially as set forth, to allow of receiving the pneumatic bucket from either direction, as set forth.

10. The pneumatic bucket or carrier formed as a tube, open at one end, and provided with a thick disk of felt or other elastic substance at the closed front end, substantially as set forth.

In testimony whereof I have hereunto set my hand this 16th day of November, 1880.

EDWIN S. LEAYCRAFT.

In presence of—

CHARLES G. COE,
LOUIS W. FROST.